(12) United States Patent
Wang et al.

(10) Patent No.: US 6,750,163 B2
(45) Date of Patent: Jun. 15, 2004

(54) MELT PROCESSABLE POLY (ETHYLENE OXIDE) FIBERS

(75) Inventors: James Hongxue Wang, Appleton, WI (US); David Michael Schertz, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 229 days.

(21) Appl. No.: 09/829,527

(22) Filed: Apr. 10, 2001

(65) Prior Publication Data

US 2001/0031357 A1 Oct. 18, 2001

Related U.S. Application Data

(62) Division of application No. 09/001,525, filed on Dec. 31, 1997, now Pat. No. 6,372,850.

(51) Int. Cl.[7] .......................... B32B 27/04; B32B 27/12; D04H 3/16; D04H 1/54
(52) U.S. Cl. .................. 442/149; 442/327; 442/401; 442/402; 442/409; 442/414
(58) Field of Search ................ 442/327, 149, 442/401, 402, 409, 414

(56) References Cited

U.S. PATENT DOCUMENTS

| | | |
|---|---|---|
| 3,177,270 A | 4/1965 | Jones et al. |
| 3,323,978 A | 6/1967 | Rasmussen |
| 3,539,666 A | 11/1970 | Schimer |
| 3,544,655 A | 12/1970 | Booth et al. |
| 3,666,737 A | 5/1972 | Lal et al. |
| 3,676,529 A | 7/1972 | Fall |
| 3,717,541 A | 2/1973 | Schimer |
| 3,734,876 A | 5/1973 | Chu |
| 3,763,277 A | 10/1973 | Chu et al. |
| 3,830,888 A | 8/1974 | King |
| 3,833,708 A | 9/1974 | Miller et al. |
| 3,843,589 A | 10/1974 | Wartman |
| 3,862,266 A | 1/1975 | McConnell et al. |
| 3,868,433 A | 2/1975 | Bartz et al. |
| 3,891,584 A | 6/1975 | Ray-Chaudhuri et al. |
| 3,933,943 A | 1/1976 | Fahrbach et al. |

(List continued on next page.)

FOREIGN PATENT DOCUMENTS

| | | |
|---|---|---|
| AU | 52355/93 | 3/1994 |
| DE | 1806165 | 5/1969 |
| EP | 0184440 | 6/1986 |

(List continued on next page.)

OTHER PUBLICATIONS

Derwent Publications, EP 0316792 (Cassella AG), May 24, 1989. Abstract.
Bartczak, Z. Changes in Interface Shape During Crystallization in Two–Component Polymer Systems *Polymer* vol. 27, pp. 544–554 Apr. 27, 1986.
Mortensen, Phase Behavior of Poly(propylene Oxide)–Poly(ethylene oxide)–Poly(propylene oxide) Triblock Copolymer Melt and Aqueous Solutions *Macromolecules*, Jan. 1, 1994.

(List continued on next page.)

*Primary Examiner*—Ula C. Ruddock
*Assistant Examiner*—Christopher C Pratt
(74) *Attorney, Agent, or Firm*—Brinks Hofer Gilson & Lione; G. Peter Nichols (57) ABSTRACT

Melt processable, flushable polymer fibers and methods of making melt processable, flushable polymer fibers are disclosed. The fibers comprise poly(ethylene oxide). Preferably, the poly(ethylene oxide) is modified by grafting polar vinyl monomers, such as poly(ethylene glycol) methacrylate and 2-hydroxyethyl methacrylate, onto poly(ethylene oxide). The modified poly(ethylene oxide) has improved melt processability and can be used to melt process poly(ethylene oxide) fibers of thinner diameters.

13 Claims, 3 Drawing Sheets

U.S. PATENT DOCUMENTS

| | | |
|---|---|---|
| 3,935,141 A | 1/1976 | Potts |
| 3,941,865 A | 3/1976 | Miller et al. |
| 3,953,655 A | 4/1976 | Steinkamp et al. |
| 3,954,928 A | 5/1976 | Omori et al. |
| 3,957,605 A | 5/1976 | Assarsson et al. |
| 3,963,805 A | 6/1976 | Chu |
| 3,972,961 A | 8/1976 | Hammer et al. |
| 3,993,551 A | 11/1976 | Assarsson et al. |
| 4,018,729 A | 4/1977 | Faucher et al. |
| 4,021,509 A | 5/1977 | Murayama et al. |
| 4,029,720 A | 6/1977 | Seiler et al. |
| 4,080,405 A | 3/1978 | Agouri et al. |
| 4,097,652 A | 6/1978 | Hartigan, Jr. |
| 4,200,704 A | 4/1980 | Stanley et al. |
| 4,206,155 A | 6/1980 | Korber |
| 4,225,650 A | 9/1980 | van Brederode et al. |
| RE30,754 E | 9/1981 | Hammer et al. |
| 4,528,334 A | 7/1985 | Knopf et al. |
| 4,619,988 A | 10/1986 | Leung et al. |
| 4,705,525 A | 11/1987 | Abel et al. |
| 4,705,526 A | 11/1987 | Abel et al. |
| 4,725,492 A | 2/1988 | Yazaki et al. |
| 4,792,477 A | 12/1988 | Ochiumi |
| 4,810,612 A | 3/1989 | Ueda et al. |
| 4,840,851 A | 6/1989 | Golander et al. |
| 4,868,222 A | 9/1989 | Chau et al. |
| 4,874,540 A | 10/1989 | Greenwald et al. |
| 4,883,699 A | 11/1989 | Aniuk et al. |
| 5,011,892 A | 4/1991 | Engelhardt et al. |
| 5,041,496 A | 8/1991 | Engelhardt et al. |
| 5,059,630 A | 10/1991 | Fujita et al. |
| 5,075,061 A | 12/1991 | Howell |
| 5,095,619 A | 3/1992 | Davis et al. |
| 5,173,539 A | 12/1992 | Boocock et al. |
| 5,209,849 A | 5/1993 | Hu et al. |
| 5,217,798 A * | 6/1993 | Brady et al. ............... 428/246 |
| 5,260,371 A | 11/1993 | Chen |
| 5,300,574 A | 4/1994 | Bacskai |
| 5,342,861 A | 8/1994 | Raykovitz |
| 5,346,959 A | 9/1994 | Goman (Gomez) Peter M. et al. |
| 5,354,618 A | 10/1994 | Ishigaki et al. |
| 5,360,419 A | 11/1994 | Chen |
| 5,360,586 A | 11/1994 | Wyatt et al. |
| 5,364,907 A | 11/1994 | Rolando et al. |
| 5,367,003 A | 11/1994 | Petcavich |
| 5,369,168 A | 11/1994 | Famili et al. |
| 5,382,703 A | 1/1995 | Nohr et al. |
| 5,385,974 A | 1/1995 | Ohmae |
| 5,391,423 A | 2/1995 | Wnuk et al. |
| 5,395,308 A | 3/1995 | Fox et al. |
| 5,412,029 A | 5/1995 | Elm et al. |
| 5,415,905 A | 5/1995 | Middlesworth et al. |
| 5,417,679 A | 5/1995 | Toms et al. |
| 5,429,874 A | 7/1995 | vanPutte et al. |
| 5,444,123 A | 8/1995 | Zeltner et al. |
| 5,446,100 A | 8/1995 | Durrance et al. |
| 5,468,259 A | 11/1995 | Sheth et al. |
| 5,480,928 A | 1/1996 | Stratta |
| 5,489,470 A | 2/1996 | Noda |
| 5,489,647 A | 2/1996 | Kussmaul |
| 5,498,692 A | 3/1996 | Noda |
| 5,498,785 A | 3/1996 | Wang et al. |
| 5,509,913 A | 4/1996 | Yeo |
| 5,532,066 A | 7/1996 | Latiolais et al. |
| 5,540,663 A | 7/1996 | Kroner et al. |
| 5,541,259 A | 7/1996 | Doi |
| 5,549,791 A | 8/1996 | Herron et al. |
| 5,587,434 A | 12/1996 | McCullough, Jr. et al. |
| 5,674,578 A | 10/1997 | Giori |
| 5,700,872 A | 12/1997 | Wang et al. |
| 5,753,169 A | 5/1998 | Kaito et al. |
| 5,807,930 A | 9/1998 | Wang et al. |
| 5,952,433 A | 9/1999 | Wang et al. |
| 6,063,866 A | 5/2000 | Wang et al. |
| 6,117,947 A | 9/2000 | Wang et al. |
| 6,172,177 B1 | 1/2001 | Wang et al. |
| 6,214,933 B1 | 4/2001 | Wang et al. |
| 6,225,406 B1 | 5/2001 | Wang et al. |
| 6,255,386 B1 | 7/2001 | Wang et al. |

FOREIGN PATENT DOCUMENTS

| | | |
|---|---|---|
| EP | 0461785 | 12/1991 |
| EP | 0473091 | 3/1992 |
| EP | 0488119 | 6/1992 |
| EP | 0507561 | 10/1992 |
| EP | 0515949 | 12/1992 |
| EP | 0640650 | 3/1995 |
| EP | 0725090 | 8/1996 |
| GB | 2070046 | 9/1981 |
| GB | 2295553 | 6/1996 |
| JP | 49-126742 | 12/1974 |
| JP | 60195151 | 10/1985 |
| JP | 61-272217 | 12/1986 |
| JP | 5-309111 | 11/1993 |
| WO | WO 94/00163 | 1/1994 |
| WO | WO 94/00293 | 1/1994 |
| WO | WO 95/11929 | 5/1995 |
| WO | WO 95/20614 | 8/1995 |
| WO | WO 95/20615 | 8/1995 |
| WO | WO 95/20621 | 8/1995 |
| WO | WO 95/23249 | 8/1995 |
| WO | WO 95/23250 | 8/1995 |
| WO | WO 96/20831 | 7/1996 |
| WO | WO 96/21057 | 7/1996 |
| WO | WO 96/21475 | 7/1996 |

OTHER PUBLICATIONS

Song, Z. and Melt Grafting of T–Butylaminoethyl Methacrylate Onto Polyethylene *Polymer* vol. 33(15) pp. 3266–3 Jan. 1, 1992.

Tang, Tao Compatibilization of Polypropylene/Poly(Ethylene Oxide) Blends and Crystallization Behavior of the Blends *Journal of Polymer Science: Part B: Polymer* vol. 32, pp. 1991–1 Jan. 1, 1994.

Standard Test Method for Tensile Properties of Plastics *American Society for Testing and Material* pp. 45–56 Dec. 1, 1995.

Hu, Guo–Hua, Free Radical Grafting of Chemically Activated Maleic anhydride onto Polypropylene by Reactive Extrusion—abstract only *Annu. Tech. Conf.—Soc. Plast. Eng.* vol. 3, Jan. 1, 1994.

Callais, Peter The Maleic Anhydride Grafting of Polypropylene with Organic Peroxides—abstract only *Compalloy '90* Jan. 1, 1990.

Sperling, L.H. Graft Copolymers *Introduction to Physical Polymer Science*, pp. 44–47 Jan. 1, 1986.

Database JP 47–039730 (Toray Ind. Inc.).

Database JP 43–005180 (Seitetsu Chem. Ind. Co.).

Patent JP 8–311719 (Unitlka Ltd.), Nov. 26, 1996.

\* cited by examiner

MELT PROCESSABLE POLY (ETHYLENE OXIDE) FIBERS

This application is a divisional of application Ser. No. 09/001,525 filed Dec. 31, 1997 now U.S. Pat. No. 6,372,850.

FIELD OF THE INVENTION

The present invention is directed to polymer fibers comprising poly(ethylene oxide) compositions and methods of making polymer fibers comprising poly(ethylene oxide). More particularly, the present invention is directed to fibers comprising grafted poly(ethylene oxide) compositions.

BACKGROUND OF THE INVENTION

Disposable personal care products such as pantiliners, diapers, tampons etc. are a great convenience. Such products provide the benefit of one time, sanitary use and are convenient because they are quick and easy to use. However, disposal of many such products is a concern due to limited landfill space. Incineration of such products is not desirable because of increasing concerns about air quality and the costs and difficulty associated with separating such products from other disposed, non-incineratable articles. Consequently, there is a need for disposable products which may be quickly and conveniently disposed of without dumping or incineration.

It has been proposed to dispose of such products in municipal and private sewage systems. Ideally, such products would be flushable and degradable in conventional sewage systems. Products suited for disposal in sewage systems and that can be flushed down conventional toilets are termed "flushable" herein. Disposal by flushing provides the additional benefit of providing a simple, convenient and sanitary means of disposal. Personal care products must have sufficient strength under the environmental conditions in which they will be used and be able to withstand the elevated temperature and humidity conditions encountered during use and storage yet still lose integrity upon contact with water in the toilet. Therefore, a water-disintegratable material which is thermally processable into fibers having mechanical integrity when dry is desirable.

Due to its unique interaction with water and body fluids, poly(ethylene oxide) (hereinafter PEO) is currently being considered as a component material in fibers and flushable products. PEO, is a commercially available water-soluble polymer that can be produced from the ring opening polymerization of the ethylene oxide, Because of its water-soluble properties, PEO is desirable for flushable applications. However, there is a dilemma in utilizing PEO in the fiber-making processes. PEO resins of low molecular weights, for example 200,000 g/mol. have desirable melt viscosity and melt pressure properties for extrusion processing but cannot be processed into fibers due to their low melt elasticities and low melt strengths. PEO resins of higher molecular weights, for example greater than 1,000,000 g/mol, have melt viscosities that are too high for fiber-spinning processes. These properties make conventional PEO difficult to process into fibers using conventional fiber-making processes.

PEO melt extruded from spinning plates and fiber spinning lines resists drawing and is easily broken. PEO resins do not form fibers using conventional melt fiber-making processes. As used herein, fibers are defined as filaments or threads or filament-like or thread-like structures with diameters of about 100 microns and less. Conventional PEO resins can only be melt processed into strands with diameters in the range of several millimeters. Therefore, PEO compositions with appropriate melt viscosities for processing fibers and with greater melt elasticities and melt strengths are desired.

In the personal care industry, flushable melt-spun fibers are desired for commercial viability and ease of disposal. PEO fibers have been produced by a solution casting process. However, it has not been possible to melt process PEO fibers using conventional fiber making techniques such as melt spinning. Melt processing techniques are more desirable than solution casting because melt processing techniques are more efficient and economical. Melt processing of fibers is needed for commercial viability. Prior art PEO compositions cannot be extruded into the melt with adequate melt strength and elasticity to allow attenuation of fibers. Presently, fibers cannot be produced from conventional PEO compositions by melting spinning.

Thus, currently available PEO resins are not practical for melt extrusion into fibers or for personal care applications. What is needed in the art, therefore, is a means to overcome the difficulties in melt processing of PEO resins so that PEO resins can be formed into fibers for later use as components in flushable, personal care products.

SUMMARY OF THE INVENTION

The present invention is directed to polymer fibers comprising PEO compositions and methods of making polymer fibers comprising PEO. More particularly, the present invention is directed to fibers comprising grafted PEO compositions. The modified PEO compositions have improved melt processability, allowing fibers to be drawn using conventional fiber-making techniques and apparatusses. The modification of the PEO resins is accomplished by grafting a polar vinyl monomer, such as a poly(ethylene glycol) methacrylate or 2-hydroxyethyl methacrylate, onto the PEO. The grafting is accomplished by mixing the PEO, the monomer (s) and a free radical initiator and applying heat. The resulting grafted PEOs have improved melt processability and may be used to melt process fibers using conventional fiber processing techniques.

To overcome the disadvantages of the prior art, this invention teaches fibers comprising PEO coplymers comprising grafted polar functional groups. Such modification of PEO reduces the melt viscosity and melt pressure of the PEO. The modified PEO resins can be solidified for later thermal processing into fibers or processed directly into fibers. The fibers are water soluble and are useful as components in personal care products.

As used herein, the term "graft copolymer" means a copolymer produced by the combination of two or more chains of constitutionally or configurationally different features, one of which serves as a backbone main chain, and at least one of which is bonded at some point(s) along the backbone and constitutes a side chain. As used herein, the term "grafting" means the forming of a polymer by the bonding of side chains or species at some point(s) along the backbone of a parent polymer. (See Sperling, L. H., *Introduction to Physical Polymer Science* 1986 pp. 44-47 which is incorporated by reference herein in its entirety.)

Modification of PEO in accordance with the invention improves the melt properties of PEO and allows the thermal processing of fibers from PEO. The modified PEO compositions have increased melt strength and increased melt elasticity yet have reduced melt viscosity. These changes make it possible to produce PEO fibers using conventional fiber processing methods. Modification of PEO resins with starting molecular weights of between about 50,000 g/mol to about 400,000 g/mol allows the PEO resin to be extruded into thin fibers using conventional melt spinning processes. Modification of PEO resins with starting molecular weights of between about 50,000 g/mol to about 300,000 g/mol is desirable and modification of PEO resins with starting molecular weights of between about 50,000 g/mol to about 200,000 g/mol is most desirable for fiber-making purposes. The modification of PEO in accordance with this invention improves the melt properties of the PEO allowing the modified PEO to be melted and attenuated into fibers. Thus, the modified PEO can be processed into water-soluble fibers using both meltblown and spunbond processes which are useful as components in liners, cloth-like outer covers, etc. in flushable personal care products.

These and other features and advantages of the present invention will become apparent after a review of the following detailed description of the disclosed embodiments.

DETAILED DESCRIPTION

Fibers can be made using conventional processing methods from commercially available PEO resins when modified in accordance with this invention. The PEO resins useful for modification include, but are not limited to, PEO resins having initial reported approximate molecular weights ranging from about 50,000 g/mol to about 8,000,000 g/mol. Higher molecular weights are desired for increased mechanical and physical properties and lower molecular weights are desired for ease of processing. Desirable PEO resins have molecular weights ranging from about 50,000 to about 400,000 g/mol before modification. More desirable PEO resins have molecular weights ranging from about 50,000 to about 300,000 g/mol, even more desirably from about 50,000 to about 200,000 g/mol, before modification.

The modified PEO compositions from the above resins provide a balance between mechanical and physical properties and processing properties. Two PEO resins within the above desirable ranges are commercially available from Union Carbide Corporation and are sold under the trade designations POLYOX® WSR N-10 and POLYOX® WSR N-80. These two resins have reported approximate molecular weights, as determined by Theological measurements, of about 100,000 g/mol and 200,000 g/mol, respectively.

Other PEO resins available from Union Carbide Corporation within the above approximate molecular weight ranges can be used (See POLYOX®: Water Soluble Resins, Union Carbide Chemicals & Plastic Company, Inc., 1991 which is incorporated by reference herein in its entirety.) as well as other PEO resins available from other suppliers and manufacturers Both PEO powder and pellets of PEO can be used in this invention since the physical form of PEO does not affect its behavior in the melt state for grafting reactions. This invention has been demonstrated by the use of several of the aforementioned PEO resins in powder form as supplied by Union Carbide in and resins in pellet form as supplied by Planet Polymer Technologies, Inc. of San Diego, Calif. The initial PEO resin and modified PEO compositions may optionally contain various additives such as plasticizers, processing aids, rheology modifiers, antioxidants, UV light stabilizers, pigments, colorants, slip additives, antiblock agents, etc.

A variety of polar vinyl monomers may be useful in the practice of this invention. Monomer(s) as used herein includes monomers, oligomers, polymers, mixtures of monomers, oligomers and/or polymers, and any other reactive chemical species which is capable of covalent bonding with the parent polymer, PEO. Ethylenically unsaturated monomers containing a polar functional group, such as hydroxyl, carboxyl, amino, carbonyl, halo, thiol, sulfonic, sulfonate, etc. are appropriate for this invention and are desrable. Desired ethylenically unsaturated monomers include acrylates and methacrylates. Particularly desired ethylenically unsaturated monomers containing a polar functional group are 2-hydroxyethyl methacrylate (hereinafter HEMA) and poly(ethylene glycol) methacrylates (hereinafter PEG-MA). A particularly desired poly (ethylene glycol) methacrylate is poly(ethylene glycol) ethyl ether methacrylate. However, it is expected that a wide range of polar vinyl monomers would be capable of imparting the same effects as HEMA and PEG-MA to PEO and would be effective monomers for grafting. The amount of polar vinyl monomer relative to the amount of PEO may range from about 0.1 to about 20 weight percent of monomer to the weight of PEO. Desirably, the amount of monomer should exceed 0.1 weight percent in order to sufficiently improve the processability of the PEO. More desirably, the amount of monomer should be at the lower end of the above disclosed range, 0.1 to 20 weight percent, in order to decrease costs. A range of grafting levels is demonstrated in the Examples. Typically, the monomer addition levels were between 2.5 to 15 percent of the weight of the base PEO resin.

This invention has been demonstrated in the following Examples by the use of PEG-MA and HEMA as the polar vinyl monomers. Both the PEG-MA and HEMA were supplied by Aldrich Chemical Company. The HEMA used in the Examples was designated Aldrich Catalog number 12,863-5 and the PEG-MA was designated Aldrich Catalog number 40,954-5. The PEG-MA was a poly(ethylene glycol) ethyl ether methacrylate having a number average molecular weight of approximately 246 grams per mol. PEG-MA with a number average molecular weight higher or lower than 246 g/mol are also applicable for this invention. The molecular weight of the PEG-MA can range up to 50,000 g/mol. However, lower molecular weights are desirable for faster grafting reaction rates. The desirable range of the molecular weight of the monomers is 246 to 5,000 g/mol and the most desirable range is 246 to 2,000 g/mol. Again, it is expected that a wide range of polar vinyl monomers as well as a wide range of molecular weights of monomers would be capable of imparting similar effects to PEO resins and would be effective monomers for grafting and modification purposes.

A variety of initiators may be useful in the practice of this invention. If grafting is achieved by the application of heat, as in a reactive-extrusion process, it is desirable that the initiator generates free radicals with the application of heat. Such initiators are generally referred to as thermal initiators. In order for the initiator to function as a useful source of radicals for grafting, the initiator should be commercially and readily available, stable at ambient or refrigerated conditions, and generate radicals at reactive-extrusion temperatures.

Compounds containing an O—O, S—S, or N=N bond may be used as thermal initiators. Compounds containing O—O bonds, such as peroxides, are commonly used as initiators for polymerization. Such commonly used peroxide initiators include: alkyl, dialkyl, diaryl and arylalkyl peroxides such as cumyl peroxide, t-butyl peroxide, di-t-butyl peroxide, dicumyl peroxide, cumyl butyl peroxide, 1,1-di-t-butyl peroxy-3,5,5-trimethylcyclohexane, 2,5-dimethyl-2, 5-di(t-butylperoxy)hexane, 2,5-dimethyl-2,5-bis(t-butylperoxy)hexyne-3 and bis(a-t-butyl peroxyisopropylbenzene); acyl peroxides such as acetyl peroxides and benzoyl peroxides; hydroperoxides such as cumyl hydroperoxide, t-butyl hydroperoxide, p-methane hydroperoxide, pinane hydroperoxide and cumene hydroperoxide; peresters or peroxyesters such as t-butyl peroxypivalate, t-butyl peroctoate, t-butyl perbenzoate, 2,5-dimethylhexyl-2,5-di(perbenzoate) and t-butyl di(perphthalate); alkylsulfonyl peroxides; dialkyl peroxymonocarbonates; dialkyl peroxydicarbonates; diperoxyketals; ketone peroxides such as cyclohexanone peroxide and methyl ethyl ketone peroxide. Additionally, azo compounds such as 2,2'-azobisisobutyronitrile abbreviated as AIBN, 2,2'-azobis(2,4-dimethylpentanenitrile) and 1,1'-azobis (cyclohexanecarbonitrile) may be used as the initiator. This invention has been demonstrated in the following Examples by the use of a liquid, organic peroxide initiator available from Elf Atochem North America, Inc. of 200 Market Street, Philadelphia, Pa., sold under the trade designation LUPERSOL® 101. LUPERSOL® 101 is a free radical initiator and comprises 2,5-dimethyl-2,5-di(t-butylperoxy)hexane. Other initiators and other grades of the LUPERSOL® initiators may also be used, such as LUPERSOL® 130.

A variety of reaction vessels may be useful in the practice of this invention. The modification of the PEO can be performed in any vessel as long as the necessary mixing of PEO, the monomer and the initiator is achieved and enough thermal energy is provided to effect grafting. Desirably, such vessels include a suitable mixing device, such as Bradender Plasticorders, Haake extruders, a single or multiple screw extruders, or any other mechanical mixing devices which can be used to mix, compound, process or fabricate polymers. In the Examples below, the reaction device is a counter-rotating twin-screw extruder, such as a Haake extruder available from Haake, 53 West Century Road, Paramus, N.J. 07652 or a co-rotating, twin-screw extruder, such as a ZSK-30 twin-screw, compounding extruder manufactured by Werner & Pfleiderer Corporation of Ramsey, N.J. It should be noted that a variety of extruders can be used to modify the PEO and to produce fibers in accordance with the invention provided that mixing and heating occur.

The ZSK-30 extruder allows multiple feeding, has venting ports and is capable of producing modified PEO at a rate of up to 50 pounds per hour. If a higher rate of production of modified PEO is desired, a commercial-scale ZSK-58 extruder manufactured by Werner & Pfleiderer may be used. The ZSK-30 extruder has a pair of co-rotating screws arranged in parallel with the center to center distance between the shafts of the two screws at 26.2 mm. The nominal screw diameters are 30 mm. The actual outer diameters of the screws are 30 mm and the inner screw diameters are 21.3 mm. The thread depth is 4.7 mm. The lengths of the screws are 1328 mm and the total processing section length was 1338 mm. This ZSK-30 extruder had 14 processing barrels, which are numbered consecutively 1 to 14 from the feed barrel to the die for the purposes of this disclosure. The first barrel, barrel #1, received the PEO and was not heated but cooled by water. The die used to extrude the modified PEO strands has four openings of 3 mm in diameter which are separated by 7 mm. The modified PEO strands were extruded onto an air-cooling belt and then pelletized. The extruded PEO melt strands were cooled by air on a fan-cooled conveyor belt 20 feet in length.

Another extruder suitable as the reaction device includes a Haake extruder. The modified PEO compositions of Examples 31, 32 and 33 suitable for fiber-making purposes were modified by a reactive extrusion process using a Haake extruder. The Haake extruder that was used was a counter-rotating, twin-screw extruder that contained a pair of custom-made, counter rotating conical screws. The Haake extruder had a length of 300 millimeters. Each conical screw had a diameter of 30 millimeters at the feed port and a diameter of 20 millimeters at the die. The monomer and the initiator were added at the feed throat of the Haake extruder contemporaneously with the PEO resin.

The Haake extruder comprised six sections as follows: Section 1 comprised a double-flighted forward pumping section having a large screw pitch and high helix angle. Section 2 comprised a double-flighted forward pumping section having a smaller screw pitch than Section 1. Section 3 comprised a double-flighted forward pumping section having a smaller screw pitch than Section 2. Section 4 comprised a double-flighted and notched reverse pumping section where one complete flight was notched. Section 5 comprised a double-flighted and notched forward pumping section containing two complete flights. And, Section 6 comprised a double-flighted forward pumping section having a screw pitch intermediate that of Section 1 and Section 2.

COMPARATIVE EXAMPLE A

A PEO resin having a molecular weight of about 200,000 g/mol was processed through the Haake extruder under similar conditions as the modified examples of the invention for comparative purposes and to demonstrate that conventional, unmodified PEO resins cannot be melt processed into fibers. The 200,000 g/mol molecular weight unmodified PEO resin that was used for this comparative example was obtained from Planet Polymer Technologies. The resin obtained from Planet Polymer Technologies was in pellet form and was compounded from POLYOX® WSR N-80 PEO resin manufactured by Union Carbide Corp.

For processing, the extruder barrel temperatures were set at 170, 180 and 180° C. for the first, second, third heating zones, respectively, and 190° C. for the die. The screw speed was set at 150 rpm. The PEO resin was fed into the extruder at a throughput of about 5 pounds per hour. No monomer or initiator was added to the PEO resin of Comparative Example A. The unmodified PEO was extruded under the above conditions, cooled in air and pelletized for later use. Attempts were made to melt process the unmodified PEO of Comparative Example A into fibers. Because the melted PEO of Comparative Example A had too low melt elasticity and too low melt strength to allow attenuation of the PEO melt, fibers could not be melt processed using conventional fiber-spinning techniques, such as Lurgi gun, starter gun and free fall. The PEO melt extruded from the spinning plate snapped easily and did not allow the unmodified PEO to be drawn into fibers. Only strands of about 1 to 2 millimeters in diameter were able to be produced from the unmodified PEO of Comparative A.

COMPARATIVE EXAMPLE B

A PEO resin having a molecular weight of about 100,000 g/mol was processed through the Haake extruder under the same conditions as above Comparative Example A. The 100,000 g/mol molecular weight PEO resin that was used for this Comparative Example B was obtained from Planet Polymer Technologies was in pellet form and was compounded from POLYOX® WSR N-10 PEO resin manufactured by Union Carbide Corp. Attempts were also made to melt process the unmodified PEO of Comparative Example B into fibers. Fibers of diameters of less than about 100 micrometers could not be melt processed from the unmodified 100,000 g/mol molecular weight PEO resin using conventional fiber-spinning techniques. Even then the melt could only be drawn very slowly and the melt was easily broken, making commercial production of fibers from PEO impractical. Thus, the Comparative Examples A and B demonstrate that prior art, unmodified PEO resins cannot be melt processed into fibers.

EXAMPLES

The 100,000 g/mol POLYOX® WSR N-10 PEO resin was fed into the Haake extruder at 5.3 lb/hr along with 0.53 lb/hr of PEG-MA monomer and 0.026 lb/hr of LUPERSOL® 101 free radical initiator, Example 3 of Table 1. The 200,000 g/mol POLYOX® WSR N-80 PEO was modified in the same manner with the same monomer and initiator at the same relative amounts, Example 2 in Table 1. When monomer and initiator were added to the PEO base resins during extrusion, the melt elasticities and the melt strengths of the PEO resins were visibly improved. These modified PEO compositions were collected in bulk and then ground into a powder for further processing into fibers.

Figure 1:
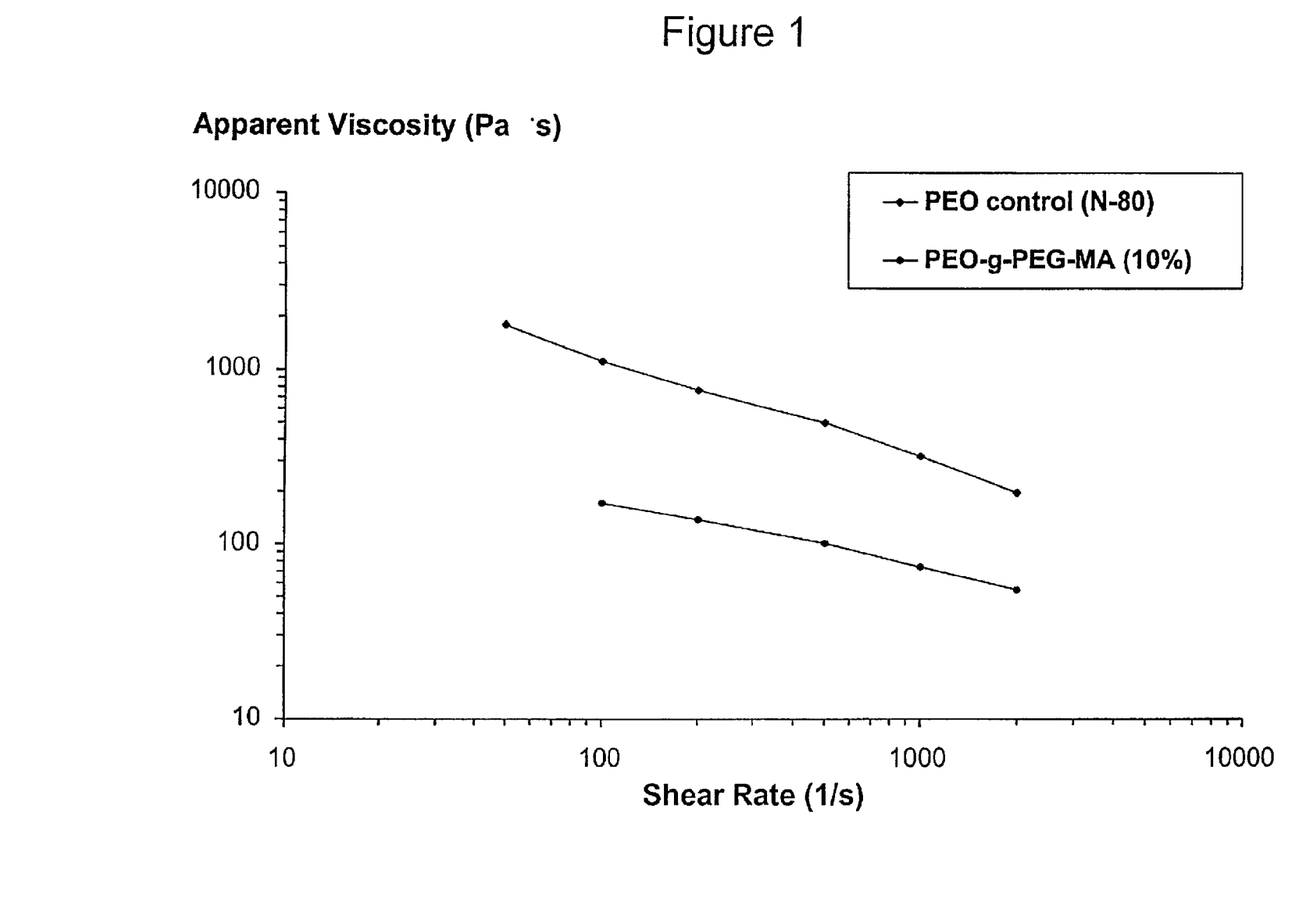
FIG. 1 is a graph comparing the melt viscosities of an unmodified 200,000 g/mol molecular weight PEO, Comparative Example A, versus the melt viscosities of the same PEO resin after modification, Example 2.

The melt viscosities of the PEO resins were observed to have been substantially reduced by the modification with the monomer and initiator. The melt viscosity of the unmodified and modified 200,000 g/mol PEO resins were measured at various shear rates and are presented in FIG. 1. The melt viscosity of the unmodified PEO resin, WSR N-80, was 319 Pascal*seconds (Pa*s hereinafter) at 1000 second$^{-1}$. In contrast, the melt viscosity of the same PEO resin modified by the addition of monomer and initiator, Example 2, was reduced to 74 Pa*s at the same shear rate.

The melt viscosities of Comparative Example A and Example 2 were determined by melt rheology tests performed on a Goettfert Rheograph 2003 capillary rheometer. The rheometer was operated with a 30/1 mm length/diameter die at 195° C. The apparent melt viscosities measured in Pa*s were determined at apparent shear rates of 50, 100, 200, 500, 1,000 and 2,000 second$^{-1}$ in order to develop rheology curves for each of the PEO compositions. The rheology curves of the two respective PEO compositions are presented in FIG. 1. Over the entire range of shear rates tested, the modified PEO exhibited lower apparent viscosities than the PEO from which it was modified.

The modification by grafting of the monomer onto the PEO brought about a 77 percent drop in melt viscosity. The reduced viscosity brought about by the modification of the PEO makes fiber-spinning of the PEO feasible. Fibers of very small diameters, in the range of 20-30 micrometers, were able to be continuously drawn from the above modified PEO resins. Fibers within this range of diameters are useful for making spunbond nonwoven fabrics. PEO fibers and fabrics are flushable and water-dispersible and can be used as components in flushable personal care products.

When the addition of the monomer and initiator was stopped during the extrusion process, the properties of the PEO resins reverted to their previous values and fibers could not be drawn from the unmodified PEO melt. This demonstrates that the modification does occur and improves the properties of the PEO which is critical for fiber-making and commercial viability.

Other examples of modified PEO resins were produced to further demonstrate the invention. These other examples of modified PEO resins were produced by varying: the molecular weights, 100,000 and 200,000 g/mol, and the suppliers of the PEO, Union Carbide and Planet Polymer Technology, Inc. (a compounder, hereinafter abbreviated PPT); the monomers, 2-hydroxyethyl methacrylate and the poly (ethylene glycol) ethyl ether methacrylate described above, and the amount of monomers; the amount of the LUPERSOL® 101 initiator; and the extruder. The various parameters used in the various Examples are listed in Table 1 below. The weight percentages of the components used in the Examples were calculated relative to the weight of the base resin, PEO, unless otherwise indicated.

TABLE 1

Components and Process Conditions of the Examples

| Example Number | Resin | Resin Rate (lb/hr) | Monomer | Monomer Rate (lb/hr) | Initiator | Initiator Rate (lb/hr) | Reaction Vessel |
|---|---|---|---|---|---|---|---|
| A | POLYOX N-80 | 5 | — | 0 | — | 0 | Haake |
| B | POLYOX N-10 | 5 | — | 0 | — | 0 | Haake |
| 1 | POLYOX N-80 | 5 | PEG-MA | 0.26 | L101 | 0.025 | Haake |
| 2 | POLYOX N-80 | 5 | PEG-MA | 0.49 | L101 | 0.026 | Haake |
| 3 | POLYOX N-10 | 5 | PEG-MA | 0.53 | L101 | 0.026 | Haake |
| 4 | POLYOX N-80 | 20 | PEG-MA | 0.30 | L101 | 0.026 | ZSK-30 |
| 5 | POLYOX N-80 | 20 | PEG-MA | 0.58 | L101 | 0.041 | ZSK-30 |

TABLE 1-continued

Components and Process Conditions of the Examples

| Example Number | Resin | Resin Rate (lb/hr) | Monomer | Monomer Rate (lb/hr) | Initiator | Initiator Rate (lb/hr) | Reaction Vessel |
|---|---|---|---|---|---|---|---|
| 6 | POLYOX N-80 | 20 | HEMA | 0.29 | L101 | 0.025 | ZSK-30 |
| 7 | POLYOX N-80 | 20 | HEMA | 0.58 | L101 | 0.045 | ZSK-30 |

Examples 1, 2 and 3 were processed in the Haake extruder under similar conditions as disclosed in the above Comparative Examples. The same exact extruder design, temperatures and screw speed were used. However, Examples 1, 2 and 3 included the addition of monomer and initiator to the PEO resin in order to modify the PEO resin. The listed amounts of the monomer and the initiator were added at the feed throat of the Haake extruder contemporaneously with the PEO resin.

Examples 4, 5, 6 and 7 were modified in the ZSK-30 extruder detailed above. The fourteen heated barrels of the ZSK-30 extruder consist of seven heating zones. For the modification of Examples 4-7, the seven zones of the ZSK-30 extruder were all set at 180° C. and the screw speed was set at 300 rpm. The respective monomer, HEMA or PEG-MA as listed in Table 1, was injected into barrel #4 and the initiator was injected into barrel #5. Both the monomer and the initiator were injected via a pressurized nozzle injector at the listed rate. The order in which the PEO, monomer and initiator are added to the PEO is not critical. The initiator and monomer may be added at the same time or in reverse order. It should be noted that the order used in the Examples is preferred.

Although the invention has been demonstrated by the Examples, it is understood that the PEO, the polar vinyl monomer, the initiator and the conditions can be varied depending on the type of modified PEO composition and properties desired.

Fiber-Making

Attempts were made to melt process fibers from the PEO compositions of Examples 1, 2 and 3 using conventional melt processing techniques. The modified PEO compositions of Examples 1, 2 and 3 were melt processable into fibers by a research-scale spunbond process, in contrast to the unmodified PEO compositions of Comparative Examples A and B which could not be extruded into a melt with adequate melt strength and elasticity for processing into fibers. The melt processability of the modified PEO resins was demonstrated by a conventional spunbond process on an experimental spinning line comprising a single screw extruder, a melt metering pump and a spin plate. The spunbond process was used to spin the fibers but was not used to bind the fibers.

Freefall fibers and fibers drawn by hand and by a starter gun on a fiber-spinning line were produced from the modified PEO composition of Example 1. Freefall fibers and fibers drawn by a Lurgi gun and by a starter gun on a fiber-spinning line were produced from the modified PEO composition of Example 2. Freefall fibers and fibers drawn by a starter gun on a fiber-spinning line were produced from the modified PEO composition of Example 3.

Although no attempts have been made to process fibers from the modified PEO compositions of Examples 4, 5, 6 and 7, the modified PEO compositions are expected to be melt processable into fibers. The appearance of the extruded, modified PEO compositions of Examples 4, 5, 6 and 7 was similar to the appearance of Examples 1, 2 and 3, exhibiting lower viscosities and stickier material. These reduced melt viscosities make fiber-spinning of the modified PEO compositions possible and are particularly advantageous for commercial fiber-making, especially when using methods requiring melt processing.

Some of the modified PEO compositions were converted into meltblown fibers. The fibers retained the same beneficial water-solubility as unmodified PEO. This property is particularly desired for flushable applications. The fibers produced by the spunbond process were also water-soluble and, therefore, are easily flushable.

Physical Testing and Characterization of Modified PEO and Fibers Produced From Modified PEO Tensile tests were performed on fibers produced from the modified PEO compositions of Examples 1, 2 and 3. The tests were performed using a Sintech 1/D tensile tester available from MTS Systems Corp., Machesny Park, Ill. The diameter of the fiber was measured before testing and then the fiber was tested with a grip separation of one inch and a crosshead speed of 500 mm/min. The diameters and the tensile properties of the fibers produced from the modified PEO resins of Examples 1, 2 and 3 were measured and are reported in Table 2 below. The fibers made from the 200,000 g/mol PEO were significantly more ductile than those made from the 100,000 g/mol. For fibers made from the same molecular weight PEO base resin, higher PEG-MA additional levels, for example 10 weight percent, led to significantly increased ductility of the fibers. The Lurgi gun-drawn PEO fibers at 10% PEG-MA addition had a peak stress of 7.2 MPa and 648 percent elongation-at-break. These tensile property values are extremely favorable for PEO derived fibers considering unmodified PEO is very brittle in nature.

TABLE 2

Tensile Properties of Fibers
Produced from Examples 1, 2 and 3

| Base Resin MW (g/mol) | PEG-MA Added (%) | Fiber-Drawing Process | Fiber Diameter (μm) | Peak Stress (MPa) | % Strain to Break (%) | Energy to Break (in-lb) | Tensile Modulus (MPa) |
|---|---|---|---|---|---|---|---|
| Ex. #1 200,000 | 5 | Free Fall | 104 | 11.0 | 68 | 0.0108 | 64.7 |
| Ex. #1 200,000 | 5 | Starter Gun | 65 | 9.7 | 72 | 0.0042 | 127.0 |
| Ex. #1 200,000 | 5 | Hand Drawn | 214 | 11.0 | 236 | 0.1741 | 75.8 |
| Ex. #2 200,000 | 10 | Free Fall | 104 | 9.1 | 367 | 0.0517 | 49.2 |
| Ex. #2 200,000 | 10 | Starter Gun | 102 | 8.5 | 340 | 0.0430 | 49.0 |
| Ex. #2 200,000 | 10 | Lurgi Gun | 72 | 7.2 | 648 | 0.0336 | 58.3 |
| Ex. #3 100,000 | 10 | Free Fall | 103 | 2.2 | 10 | 0.0003 | 252.4 |
| Ex. #3 100,000 | 10 | Starter Gun | 67 | 4.1 | 7.8 | 0.0001 | 232.8 |

Chemical Characterization of

GPC Analysis

The number-average molecular weight ($M_n$), the weight-average molecular weight ($M_w$), and the z-average molecular weight ($M_z$) of Comparative Examples A and B and Examples 1, 2 and 3 were determined by gel permeation chromatography (hereinafter GPC). The GPC analysis was conducted by American Polymer Standards Corporation of Mentor, Ohio. From these measurements the polydispersity indices ($M_w/M_n$) of the respective examples were calculated. The various molecular weights and the polydispersity of the examples are reported in Table 3 below.

NMR Analysis

Figure 2:
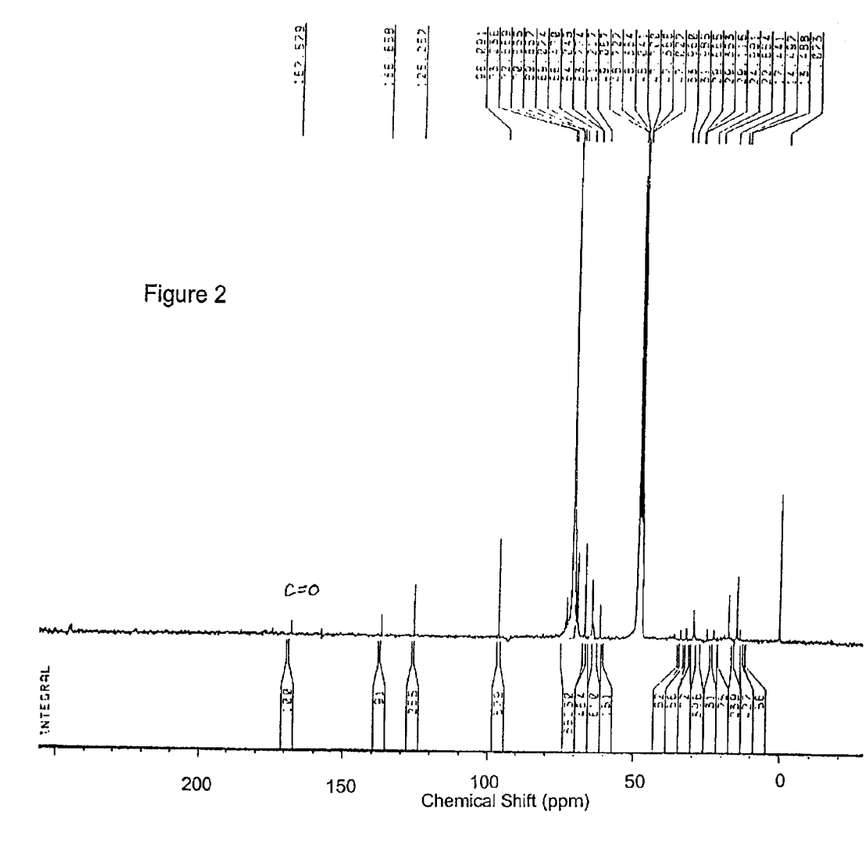
FIG. 2 is a $^{13}$C— Nuclear Magnetic Resonance spectra of the modified PEO of Example 2.
Figure 3:
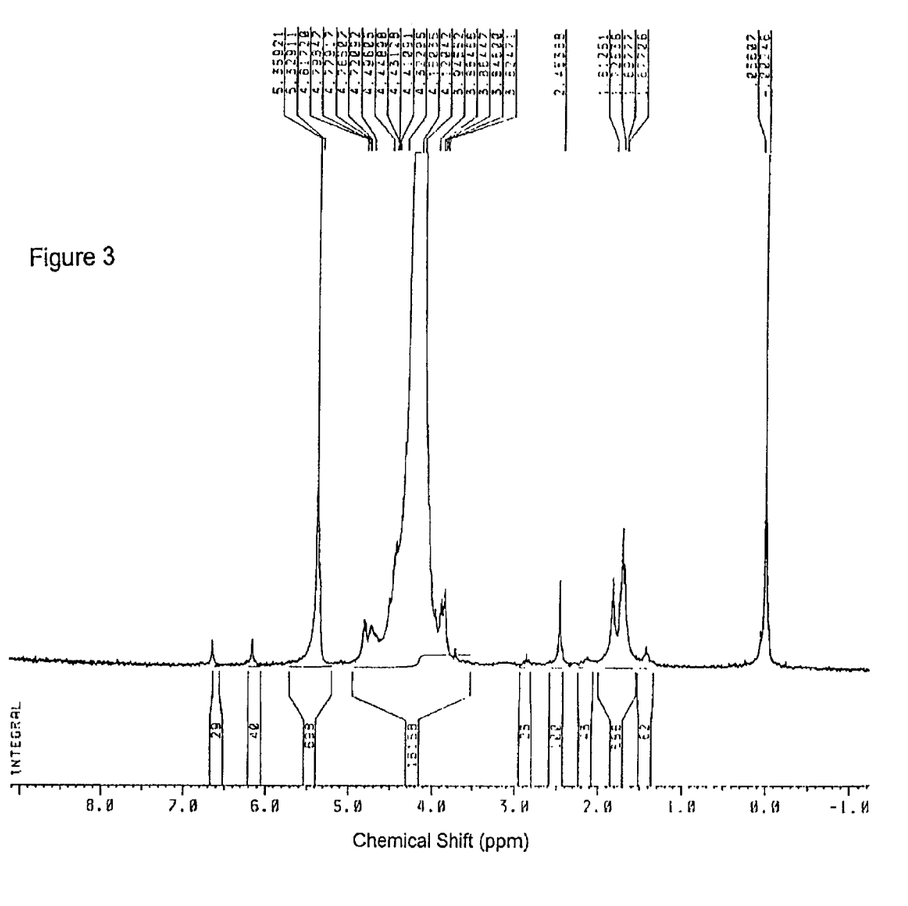
FIG. 3 is a $^1$H— Nuclear Magnetic Resonance spectra of the modified PEO of Example 2.

The modified PEO composition of the Examples 1, 2 and 3 were analyzed NMR spectroscopy. The $^{13}C$ and $^1H$ NMR spectra of Example 2 are presented as FIGS. 2 and 3, respectively. The results of this analyses confirmed that modified PEO contained PEG-MA units.

The grafting levels of the modified PEO compositions of Examples 1, 2 and 3 as measured by NMR analysis are reported as weight percentages of monomer per weight of PEO base resin that grafted to the PEO resin and are reported in Table 3. The percentages of ungrafted monomer of Examples 1, 2 and 3 are likewise reported in Table 3.

TABLE 3

Chemical Properties of Comparative Examples A and B
and the Modified PEO Compositions of Examples 1, 2 and 3

| Example No. | A | B | 1 | 2 | 3 |
|---|---|---|---|---|---|
| $M_n$ | 12,650 | 11,050 | 11,400 | 11,450 | 9,450 |
| $M_w$ | 148,100 | 115,900 | 97,200 | 109,300 | 90,600 |
| $M_z$ | 840,500 | 698,400 | 515,700 | 541,300 | 601,500 |
| $M_w/M_n$ | 11.71 | 10.49 | 8.53 | 9.53 | 9.59 |
| % PEG-MA grafting level | 0 | 0 | 4.51 | 5.08 | 5.49 |
| % residual ungrafted PEG-MA | 0 | 0 | 0.43 | 3.41 | 4.43 |

The molecular weights of the modified PEO Examples are significantly different versus the corresponding unmodified PEO resin. Significant reductions in molecular weights and the polydispersity indices were observed after reactive-extrusion of PEO with the monomer and the initiator compared to the unmodified, extruded PEO of the Comparative Examples. The weight-average molecular weight of the N-80 PEO dropped from 148,100 g/mol for the unmodified, but similarly processed, N-80 PEO of Comparative Example A to 97,200 g/mol for the 5% grafted N-80 PEO of Example 1 and to 109,300 g/mol for the 10% grafted N-80 PEO of Example 2. Similarly, the weight-average molecular weight of the N-10 PEO dropped from 115,900 g/mol for the unmodified N-10 PEO of Comparative Example B to 90,600 g/mol for the 10% grafted PEO N-10 of Example 3. Thus, the modification of the PEO resins produced a significant reduction in weight-average molecular weight. However, the number-average molecular weight was not as greatly affected by the modification, thereby, producing a significant decrease in the polydispersity index and, hence, a narrower molecular weight distribution.

The fundamental changes in modified PEO brought about by the chemical grafting have profound and unexpected effects on the physical properties and melt processability of PEO as demonstrated herein and discussed above. The narrower molecular weight distributions of the modified PEO compositions result in improved melt and solid state properties. Although not wishing to be bound by the following theory, it is believed that during the reactive-extrusion processing of PEO resins, the initiator initiated three competing reactions: 1) grafting of vinyl monomer onto the PEO, 2) degradation of the PEO, and 3) crosslinking of the PEO. A novel method of achieving improved properties has been developed that is contrary to traditional methodology and thinking in polymer development. The method degrades the polymer into shorter chains as opposed to only increasing the molecular weight by grafting and crosslinking. The resulting modified PEO compositions have improved melt strength and melt elasticity, overcoming the inherent deficiencies of both low molecular weight PEO and high molecular weight PEO.

In the case of grafting, the presence of a sufficient amount of monomer(s) as demonstrated in the Examples herein, cross-linking is negligible and does not adversely affect the properties of the modified PEO. The crosslinking reaction only predominates when there is little or no monomer present during the modification of the PEO resin. Therefore, the grafting and the degradation reactions of the PEO should predominate and are desired to produce PEO compositions suitable for film and fiber making purposes.

The modified PEO resins are observed to have improved melt strengths and melt elasticities, overcoming the inherent deficiencies of both low molecular weight and high molecular weight PEO resins. These improved melt properties allow the modified PEO to be processed into useful fibers with diameters of less than 100 micrometers using conventional fiber drawing techniques.

The present invention has been illustrated in great detail by the above specific Examples. It is to be understood that these Examples are illustrative embodiments and that this invention is not to be limited by any of the Examples or details in the Description. Those skilled in the art will recognize that the present invention is capable of many modifications and variations without departing from the scope of the invention. Accordingly, the Detailed Description and Examples are meant to be illustrative and are not meant to limit in any manner the scope of the invention as set forth in the following claims. Rather, the claims appended hereto are to be construed broadly within the scope and spirit of the invention.

What is claimed is:

1. A non-woven material comprising a fiber that includes a modified poly(ethylene oxide), wherein the modified poly(ethylene oxide) is modified by grafting a polar vinyl monomer to a poly(ethylene oxide) having an initial molecular weight within the range of about 50,000 g/mol to about 350,000 g/mol before grafting of the polar vinyl monomer.

2. The non-woven material of claim 1, wherein the fiber is melt spun.

3. The non-woven material of claim 2, wherein the poly(ethylene oxide) has an apparent viscosity of less than 200 Pascal*seconds at sheer rates of not less than 100 second$^{-1}$ and not greater than 1,000 second$^{-1}$.

4. The non-woven of claim 2, wherein the non-woven consists essentially of poly(ethylene oxide).

5. The non-woven material of claim 1, wherein the non-woven material is produced by a spun-bond process.

6. The non-woven material of claim 2, wherein the non-woven material is produced by a melt-blown process.

7. A non-woven comprising a fiber that includes a graft copolymer of a poly(ethylene oxide) having an initial molecular weight within the range of about 50,000 g/mol to about 250,000 g/mol and a polar vinyl monomer.

8. The non-woven of claim 7, wherein the modified poly(ethylene oxide) is modified from a poly(ethylene oxide) having an initial molecular weight before modification within the range of about 50.000 g/mol to about 100,000 g/mol.

9. The non-woven material of claim 7, wherein the modified poly(ethylene oxide) is modified by the addition of an initiator.

10. The non-woven material of claim 7, wherein the polar vinyl monomer is selected from the group consisting of poly(ethylene glycol) methacrylates and 2-hydroxyethyl methacrylate.

11. The non-woven material of claim 7, wherein the polar vinyl monomer is added within the range of about 0.1 to about 20 weight percent relative to the weight of the poly(ethylene oxide).

12. A non-woven comprising a fiber that includes a graft copolymer of a poly(ethylene oxide) having an initial molecular weight within the range of about 50.000 g/mol to about 250,000 g/mol and a polar vinyl monomer;

wherein the polar vinyl monomer is a poly(ethylene glycol) ethyl ether methacrylate and has an average molecular weight of not greater than about 5,000 grams per mol.

13. A non-woven comprising a fiber that includes a graft copolymer of a poly(ethylene oxide) having an initial molecular weight within the range of about 50,000 g/mol to about 250,000 g/mol and a polar vinyl monomer;

wherein the polar vinyl monomer is a poly(ethylene glycol) ethyl ether methacrylate.

* * * * *